US012013102B2

(12) United States Patent
Yang et al.

(10) Patent No.: US 12,013,102 B2
(45) Date of Patent: *Jun. 18, 2024

(54) EXPLOSION-PROOF LIGHTING DEVICE

(71) Applicant: Eaton Intelligent Power Limited, Dublin (IE)

(72) Inventors: Yang Yang, Shanghai (CN); Srinath K. Aanegola, Bangalore (IN); Peihuan Liu, Pudong (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,013

(22) Filed: Mar. 9, 2023

(65) Prior Publication Data

US 2023/0250939 A1 Aug. 10, 2023

Related U.S. Application Data

(63) Continuation of application No. 17/348,448, filed on Jun. 15, 2021, now Pat. No. 11,614,220.

(30) Foreign Application Priority Data

Jun. 15, 2020 (CN) ......................... 202010545195.3

(51) Int. Cl.
*F21V 15/01* (2006.01)
*F21K 9/68* (2016.01)
(Continued)

(52) U.S. Cl.
CPC ................ *F21V 15/01* (2013.01); *F21K 9/68* (2016.08); *F21V 29/70* (2015.01); *F21V 31/005* (2013.01); *F21Y 2115/10* (2016.08)

(58) Field of Classification Search
CPC ........ F21V 15/01; F21V 29/70; F21V 31/005; F21V 23/009; F21V 29/10; F21V 25/12; F21K 9/68; F21Y 2115/10
See application file for complete search history.

(56) References Cited

U.S. PATENT DOCUMENTS 4,600,977 A 7/1986 Barlian
2011/0280019 A1 11/2011 Zimmer et al.
(Continued)

FOREIGN PATENT DOCUMENTS

CN 209 909 670 U 1/2020
WO 2021/140060 A1 7/2021

OTHER PUBLICATIONS

European Extended Search Report for Related EP Application No. 21179589.3, dated Oct. 21, 2021, 10 pages, The Hauge, Munich, Germany.

*Primary Examiner* — Elmito Breval
(74) *Attorney, Agent, or Firm* — Stinson LLP

(57) ABSTRACT

Provided in the present invention is an explosion-proof lighting device, comprising: a device body for accommodating the explosion-proof lighting device, the device body comprising a mounting portion located in the middle portion thereof and a first heat dissipation portion and a second heat dissipation portion that extend from the bottom of the mounting portion to two sides; a plurality of light emitting diodes (LEDs) for emitting light to illuminate; an electrical drive module for powering the light emitting diodes; and a seal cover detachably connected to the device body from the bottom thereof. The present invention allows for reliable dissipation of heat generated by the light emitting diodes to the ambient environment without additionally providing a heat dissipation device, avoids the direct adverse effects of heat generated by the light emitting diodes on the electrical drive module while achieving compactness and reduced
(Continued)

20 height of the explosion-proof lighting device, and significantly reduces the number of parts and costs for production, assembly and manufacturing of the explosion-proof lighting device.

12 Claims, 2 Drawing Sheets

(51) Int. Cl.

| | |
|---|---|
| ***F21V 29/70*** | (2015.01) |
| ***F21V 31/00*** | (2006.01) |
| *F21Y 115/10* | (2016.01) |

(56) References Cited

U.S. PATENT DOCUMENTS

| | | | | |
|---|---|---|---|---|
| 2014/0210332 | A1 | 7/2014 | Zhang et al. | |
| 2015/0008826 | A1 | 1/2015 | Wu et al. | |
| 2016/0018096 | A1 | 1/2016 | Chien et al. | |
| 2016/0109111 | A1* | 4/2016 | Scarlata | F21V 5/04 362/373 |
| 2018/0003370 | A1 | 1/2018 | Mandlekar et al. | |
| 2019/0178466 | A1 | 6/2019 | Weng et al. | |
| 2019/0242569 | A1 | 8/2019 | Jiang et al. | |
| 2021/0199278 | A1 | 7/2021 | Yang et al. | |

* cited by examiner

EXPLOSION-PROOF LIGHTING DEVICE

CROSS-REFERENCE TO RELATED APPLICATION

This application is a continuation of U.S. application Ser. No. 17/348,448 filed Jun. 15, 2021, which claims the benefit of Chinese Application No. 202010545195.3, filed Jun. 15, 2020, the entire contents of which are incorporated herein by reference.

TECHNICAL FIELD

The present invention relates to an explosion-proof lighting device using at least one light emitting diode (LED) as a light source. The explosion-proof lighting device has an optimized heat dissipation design to provide an explosion-proof lighting device that has lower costs and a more compact structure.

BACKGROUND

It is known that a number of explosion-proof lighting devices or light sources for use in hazardous areas are present, and incandescent or fluorescent light sources are replaced by light emitting diodes (LEDs). These new light sources must also meet the particular requirements for placing these light sources in hazardous areas, such as fire proof enclosures, or other requirements for explosion-proof products, such as safety-increased and flameproof-type explosion-proof products. Furthermore, light output of these LED light sources is temperature-dependent. Thus, a heat dissipation device is required for such LED light sources to compensate for a decrease in luminous flux. Such heat dissipation devices also need to meet the aforementioned requirements for use in hazardous areas.

One of possible solutions to compensate for the decrease in luminous flux is to add some LEDs and multiple light reflectors in cases where a corresponding decrease in luminous flux occurs.

In addition, for an explosion-proof lighting device that utilizes a light emitting diode (LED) for emitting light or illumination, it is known that the explosion-proof lighting device has an LED control apparatus that may be, for example, an electrical or electronic ballast used to, for example, provide an appropriate voltage to the LED. It is known that the LED control apparatus is used to rectify an input alternating current voltage, and a boost converter converts the same into an adjusted direct current voltage, a so-called intermediate circuit voltage. In a currently common explosion-proof lighting device, the LED control apparatus is known to be positioned above an LED in a height direction. Therefore, the entire explosion-proof lighting device has an increased height, and therefore needs a larger accommodation space. On the other hand, hot air generated by the LED rises because the hot air has lower density than air, such that the LED control apparatus is often "heated" by heat generated by the LED, and the heat generated by the LED may damage the LED control apparatus to a certain extent. In order to alleviate the adverse effect on the LED control apparatus, it is typically considered to dissipate the heat by adding a cooling body, active cooling, a heat sink, or the like. Otherwise, the service life of the LED control apparatus will be adversely affected or shortened due to great heat input.

However, the above solutions all lead to increased costs and also to increased sizes of corresponding light sources or light source accessories.

Therefore, there is a need in the industry to design an explosion-proof lighting device having lower costs and a more compact structure.

SUMMARY

The present invention is directed to provide an explosion-proof lighting device so as to eliminate the above-described defects in the prior art and achieve the following technical effects: the present invention allows for reliable dissipation of heat generated by the light emitting diodes to an ambient environment without additionally providing heat dissipation devices, avoids the direct adverse effects of heat generated by the light emitting diodes on the electrical drive module while achieving compactness and reduced height of the explosion-proof lighting device, and significantly reduces the number of parts and costs for production, assembly and manufacturing of the explosion-proof lighting device.

According to an aspect of the present invention, an explosion-proof lighting device is provided, comprising: a device body for accommodating the explosion-proof lighting device, the device body comprising a mounting portion located in the middle portion thereof and a first heat dissipation portion and a second heat dissipation portion that extend from the bottom of the mounting portion to two sides, wherein a hollow cavity is formed inside the mounting portion; a plurality of light emitting diodes (LEDs) for emitting light to illuminate, the plurality of light emitting diodes being attached to the first heat dissipation portion and the second heat dissipation portion, respectively; an electrical drive module for powering the light emitting diodes, the electrical drive module being accommodated within the hollow cavity formed inside the mounting portion of the device body so as to be arranged in an offset arrangement with respect to the light emitting diodes attached to the first heat dissipation portion and the second heat dissipation portion; and a seal cover detachably connected to the device body from the bottom thereof, the seal cover being designed to be connected to the device body so as to be resistant to explosion pressure.

Compared with the prior art, in the explosion-proof lighting device according to the present invention, the device body and the arrangement of the electrical components of the explosion-proof lighting device in the device body are designed in an optimized manner, such that the light emitting diodes therein are allowed to be offset from the electrical drive module in the lateral direction, thereby allowing the explosion-proof lighting device to be compact and have a reduced height and preventing heat generated by the light emitting diodes from directly "heating" the electrical drive module and thus reducing a service life thereof. On the other hand, as the light emitting diode directly abuts the first heat dissipation portion and the second heat dissipation portion exposed to the ambient environment, the first heat dissipation portion and the second heat dissipation portion of the device body can be used as a heat dissipation device, thereby eliminating the need of additionally providing a heat dissipation device for performing heat dissipation on the light emitting diode as in the prior art, resulting in a simplified structure, and significantly reducing manufacturing costs, which improves competitiveness of the explosion-proof lighting device.

In a preferred embodiment, bumps for the light emitting diodes are provided on the first heat dissipation portion and the second heat dissipation portion respectively and protrude therefrom towards the seal cover, wherein the bumps, together with the first heat dissipation portion and the second heat dissipation portion, enclose and form hollow annular grooves disposed around the bumps. Therefore, the light emitting diode that generates heat during operation is allowed to be located as far as possible from the electrical drive module, and in addition, the lens of the light emitting diode can be easily connected to the device body of the explosion-proof lighting device.

In a preferred embodiment, the explosion-proof lighting device further comprises a mount having a lens, wherein the mount having the lens is attached within the hollow annular groove adhesively or in a shape mating manner. Therefore, the lens and the mount thereof can be accurately positioned with respect to the device body easily, thereby improving assembly efficiency and simplifying operation performed by an operator.

In a preferred embodiment, the seal cover is designed to have a curved shape that is generally convex downward and has a reflective surface on an inner surface thereof for upwardly reflecting light from the light emitting diodes. Therefore, a uniform distribution and transmission of the light emitted by the light emitting diodes to the outside can be easily achieved with low costs.

In a preferred embodiment, the explosion-proof lighting device further comprises a reflective mirror provided below the electrical drive module, wherein the reflective mirror is disposed between the first heat dissipation portion and the second heat dissipation portion, and the reflective mirror together with the reflective surface of the seal cover forms a light reflector of the explosion-proof lighting device. Therefore, a uniform distribution and transmission of the light emitted by the light emitting diodes to the outside is achieved easily with low costs.

In a preferred embodiment, the light reflector is symmetrically disposed with respect to a central axis of the explosion-proof lighting device such that light emitted by the plurality of light emitting diodes overlaps throughout an illumination area of the explosion-proof lighting device. Therefore, a uniform distribution and transmission of the light emitted by the light emitting diodes to the outside is achieved easily with low costs.

In a preferred embodiment, the reflective surface is a reflective film or a reflective coating coated on the inner surface of the seal cover.

In a preferred embodiment, the explosion-proof lighting device further comprises a gasket disposed along an entire inner circumference of the device body, and the seal cover is joined to the device body by means of the gasket in a sealing manner.

In a preferred embodiment, the electrical drive module is an LED control apparatus comprising a bridge rectifier and an LC series resonator, wherein the light emitting diodes are connected in parallel with a capacitor in the LC series resonator.

In a preferred embodiment, the heights of the first heat dissipation portion and the second heat dissipation portion are designed to be reduced in a direction towards the seal cover.

One part of other features and advantages of the present invention will be obvious after those skilled in the art read the present disclosure, and the other part will be described in the following detailed description with reference to the accompanying drawings.

BRIEF DESCRIPTION OF THE DRAWINGS

Embodiments of the present invention are described in detail in the following with reference to the accompanying drawings, wherein.

LIST OF REFERENCE NUMERALS

10, 20: explosion-proof lighting device; 11, 21: device body;
12, 22: electrical drive module; 13, 23: gasket; 14, 24: seal cover;
15, 25: LED bar; 16, 26: lens; 17: heat dissipation device; 18: anti-fog cover
19A, 19B: reflective mirror; 26A: mount; 27: reflective surface; 28: reflective mirror;
29: mounting portion; 30A, 30B: heat dissipation portion; R: space angle area;
31: bump;
32: recess

DETAILED DESCRIPTION OF THE EMBODIMENTS

A schematic scheme of the explosion-proof lighting device disclosed in the present invention is described in detail with reference to the accompanying drawings. Although providing the accompanying drawings is to present some implementations of the present invention, the accompanying drawings do not need to be drawn according to the size of specific implementation schemes, and certain features can be enlarged, removed, or locally exploded to better illustrate and explain the disclosure of the present invention. Part of members in the accompanying drawings can be positionally adjusted according to actual requirements without affecting the technical effect. In the description, the term "in the accompanying drawings" or similar terms do not necessary refer to all of the accompanying drawings or examples.

Some directional terms used in the following to describe the accompanying drawings, such as "front", "rear", "in", "out", "upper", and "lower", and other directional terms are construed as having normal meanings thereof and refer to those directions involved when the accompanying drawings are viewed normally. Unless otherwise specified, the directional terms in the description are substantially in accord with conventional directions understood by those skilled in the art.

The terms "first", "second" and similar terms used in the present invention do not indicate any sequence, number, or importance in the present invention, and are used only to distinguish one component from other components.

Figure 1:
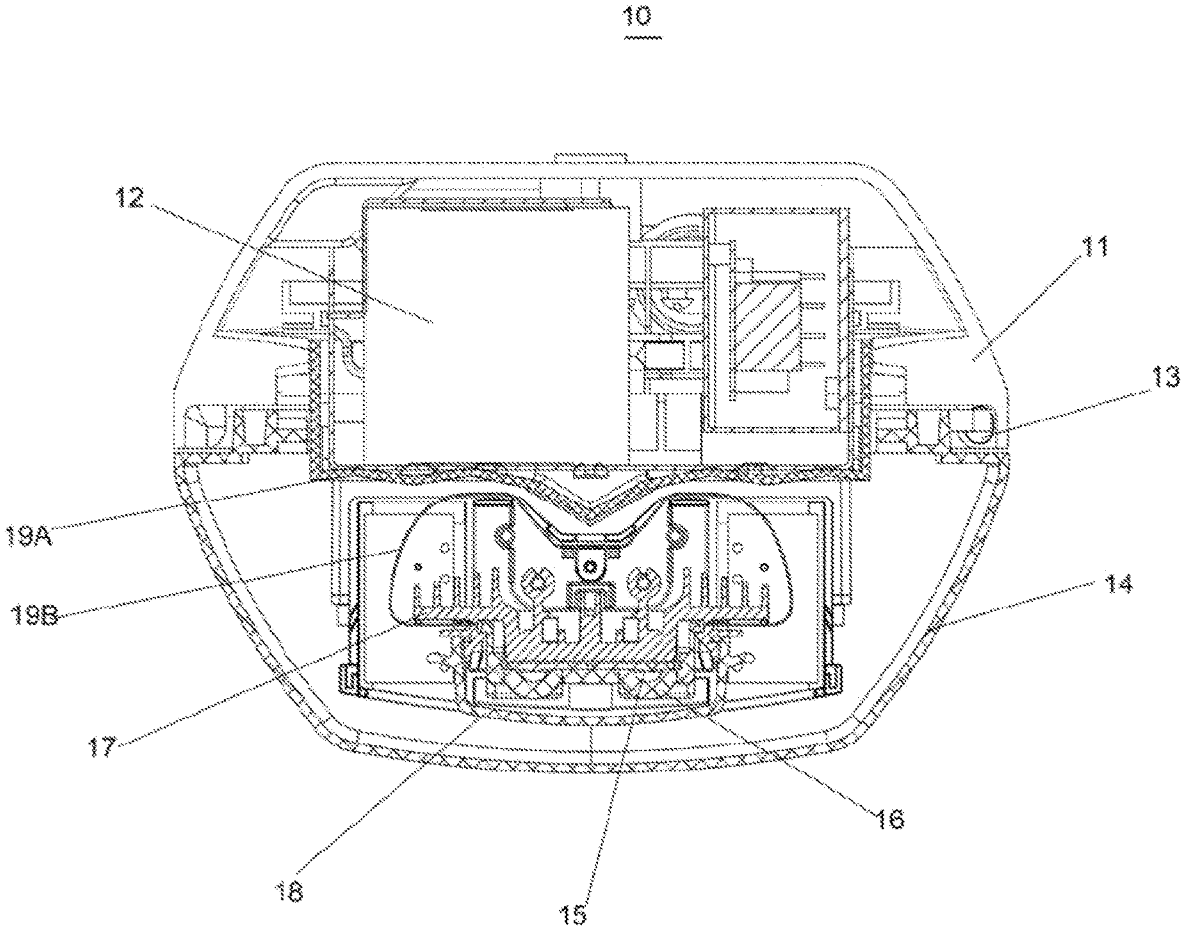
FIG. 1 shows a cross-sectional view of a conventional explosion-proof lighting device.

FIG. 1 shows an explosion-proof lighting device 10 including light emitting diodes that are used as an LED bar 15 and can be inserted therein. The explosion-proof lighting device 10 further includes, for example, a device body 11 that may be made from a metal sheet and a transparent or translucent seal cover 14. For example, the seal cover 14 may be integrally formed by using transparent engineering plastics, a resin, or the like. The device body 11 advantageously has a mounting apparatus such as a mounting support, so as to be mounted on a wall or a ceiling. Herein, the mounting apparatus may be, for example, a hook or a catch hook protruding from a plane of the device body 11, thereby allowing the explosion-proof lighting device 10 to be fixedly mounted on the wall or ceiling in a shape mating manner or in an engagement manner, and ensuring that the explosion-proof lighting device 10 is mounted on the wall or ceiling reliably in a long-term basis. Here, the seal cover 14 is detachably mounted on the device body 11 by means of a gasket 13 in a sealing manner. Preferably, the gasket 13 is disposed along an entire inner circumference of the seal cover 14 so as to prevent moisture or dust in an external environment from entering the inside of the explosion-proof lighting device 10 and adversely affecting normal operation of the explosion-proof lighting device 10.

Here, the lighting device 10 is formed to be explosion-proof, which in particular means the device body 11 and the seal cover 14 are designed in such a manner that electrical and electronic components in the device body 11 and the LED bar 15 inserted therein and a lens 16 associated therewith are protected by the seal cover 14, so that the explosion-proof lighting device 10 can also be used in a potentially explosive environmental condition. Here, the LED bar 15 and the lens 16 are combined in such a manner that corresponding light is emitted in a specific spatial area defined by an emission angle of the LED bar 15. The angle depends on the LED bar 15 and the corresponding lens 16, and ranges for example from 15° to 120°. In addition, an electrical drive module 12 that can be connected to an alternating current power supply by means of a power supply line is provided in the device body 11. Here for example, the electrical drive module 12 that may be an electronic ballast is disposed above the LED bar 15, and is configured to rectify an input alternating current voltage, and a boost converter converts the same into an adjusted direct current voltage to be used by the LED bar 15 to emit light.

As a plurality of LED bars 15 generates a great amount of heat during operation, it would be desirable to dissipate heat energy generated by the LED bars 15 to an ambient environment. Therefore, for example, a heat dissipation device 17 having a plurality of heat dissipation fins extending upwardly is disposed directly above the LED bar 15. The heat dissipation device 17 shown here is, for example, a heat dissipation member molded from a metal (such as aluminum or copper) having high thermal conductivity. A lower end surface of the heat dissipation device 17 is directly opposite to rear surfaces of the plurality of LED bars 15, and a plurality of heat dissipation fins extending upwardly are disposed on an upper end surface of the heat dissipation device 17 in a discrete manner so as to increase a heat dissipation area for dissipating heat to the ambient environment. Here, the heat dissipation device 17 is allowed to be suspended, by means of a fastener or a hook, in a cavity enclosed by the seal cover 14. More preferably, in order to facilitate heat exchange in the cavity enclosed by the seal cover 14, a fan for facilitating flowing of air may be disposed in the cavity enclosed by the seal cover 14, such that the heat energy generated by the LED bar 15 can be more effectively dissipated to the ambient environment. Certainly, these measures all correspondingly increase the overall volume, weight and production and manufacturing costs of the explosion-proof lighting device 10.

Further, it would also be desirable to prevent as much as possible the LED bar from being adversely affected by external dust and moisture. Therefore, an anti-fog cover 18 made from a light transmissive material is additionally provided at the bottom of the LED bar 15. Further, in order to increase an illumination range of the light emitted from the LED bar in the explosion-proof lighting device 10, a plurality of reflective mirrors 19 and 19A are additionally provided in the cavity enclosed by the seal cover 14, so as to increase the illumination angle and range of the explosion-proof lighting device 10 as much as possible.

Figure 2:
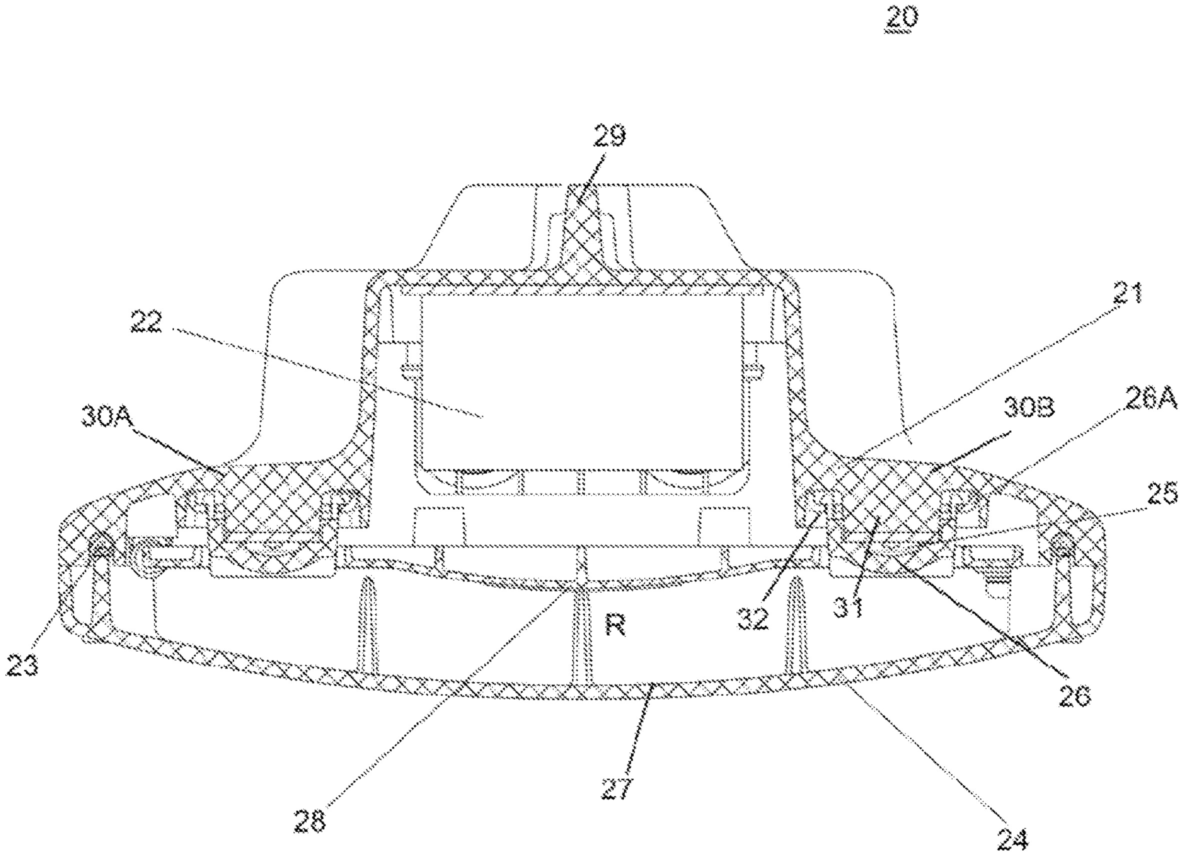
FIG. 2 shows a cross-sectional view of an explosion-proof lighting device according to the present invention.

FIG. 2 shows a cross-sectional view of an embodiment of an explosion-proof lighting device 20 according to the present invention viewed in a transverse direction of the explosion-proof lighting device 20 according to the present invention. The explosion-proof lighting device 20 of the embodiment includes a device body 21 located in an upper portion of FIG. 2 and preferably made from a metal (such as aluminum) having high thermal conductivity, and a seal cover 24 that can be detachably joined to the device body 21 by means of a gasket 23 in a sealing manner and is preferably made from a light transmissive material. Here, the seal cover 24 has a curved shape that is generally convex downward and has a reflective surface 27 that will be described in detail in the following on an inner surface thereof. In order to achieve long-term reliable sealing between the device body 21 and the seal cover 24, the gasket 23 is preferably disposed along an entire inner circumference of the device body 21. Here, the explosion-proof lighting device 20 is configured to be an ignition protective type Ex-d (pressure-resistant packaging) so as to be resistant to possible explosion pressure and prevent an explosion from propagating outward.

As shown in FIG. 2, the device body 21 includes a mounting portion 29 that is located in a middle portion and is preferably a mounting support, and a first heat dissipation portion 30A and a second heat dissipation portion 30B that extend from the bottom of the mounting portion 29 to two sides. Here, the mounting portion 29, the first heat dissipation portion 30A, and the second heat dissipation portion 30B may be preferably integrally cast. The mounting portion 29 is design to be hollow, thereby allowing an electrical drive module 22, such as an LED control apparatus, of the explosion-proof lighting device 20 to be accommodated within the hollow cavity defined by the mounting portion 29. Here, the mounting portion 29 is designed to protrude upwardly from the first heat dissipation portion 30A and the second heat dissipation portion 30B by a certain height, and a connection portion is integrally formed at the top of the mounting portion 29 and is configured to engage with or be hooked to a suspension point on a wall or ceiling. Here, a cross section of the mounting portion 29 is generally rectangular, thereby allowing a sufficiently large hollow cavity to be defined therein so as to allow the electrical drive module 22, such as the LED control apparatus, to be placed or assembled therein.

According to the present invention, the electrical drive module 22 is preferably an LED control apparatus, and includes a bridge rectifier and an LC series resonator. Light emitting diodes are connected in parallel with a capacitor in the LC series resonator. When such a bridge rectifier is in a working mode, an intermediate circuit voltage is converted into a square-wave voltage having a constant frequency. In the embodiment of the present invention, a conventional switching frequency in the LED control apparatus is generally within a range from 20 kHz to 60 kHz. As a result of this corresponding arrangement, a system having a constant voltage and a constant frequency becomes a system having a constant current, which corresponds to the principle of a Boucherot circuit.

When the light emitting diode is in use, the series resonator therein is loaded during an activation phase of the light emitting diode, such that no high voltage occurs on a corresponding capacitor of the resonator, and the resonator immediately acts as a current source. This is implemented in a simple manner, because a voltage on the capacitor of the resonator is rectified by the bridge rectifier, and the direct current voltage is directly loaded to a plurality of corresponding LEDs connected in series. In order to achieve this, preferably, diodes adjusted to the switching frequency of the LED control apparatus with respect to a reverse recovery time thereof are used in the bridge rectifier.

In this embodiment, the first heat dissipation portion 30A and the second heat dissipation portion 30B of the device body 21 are symmetrically arranged with respect to the mounting portion 29 disposed in the middle portion. The heights of the first heat dissipation portion 30A and the second heat dissipation portion 30B are designed to be steeply reduced with respect to the mounting portion 29 disposed in the middle portion, and then to be gently reduced in a downward direction. This design can prevent external moisture or dust from accumulating on the first heat dissipation portion 30A and the second heat dissipation portion 30B for a long period of time. In addition, this design can increase a heat dissipation area of the first heat dissipation portion 30A and the second heat dissipation portion 30B that dissipate heat to an ambient environment so as to achieve a desired heat dissipation effect.

Due to the mounting portion 29 disposed in the middle portion being significantly higher than the first heat dissipation portion 30A and the second heat dissipation portion 30B disposed on the two sides, for example, in a working state in which the explosion-proof lighting device 10 is mounted on the ceiling by means of the mounting portion 29, the first heat dissipation portion 30A and the second heat dissipation portion 30B extending from the two sides can dissipate heat to the ambient environment unimpededly without resulting in a heat barrier phenomenon, thereby ensuring that the explosion-proof lighting device 10 maintains a good and reliable effect of dissipating heat to the ambient environment throughout a working state period thereof.

As shown in FIG. 2, two LED bars are directly attached to inner sides of the first heat dissipation portion 30A and the second heat dissipation portion 30B located on the two sides of the device body 21, and only the LED bar 25 located on a right side of the figure is indicated by a reference numeral in FIG. 2. By means of the design, the LED bar 25 is allowed to be offset from the electrical drive module 22 in the lateral direction, thereby achieving compactness and reduced height of the explosion-proof lighting device and preventing heat generated by the LED bar 25 from directly "heating" the electrical drive module 22, as shown in FIG. 1, and thus reducing a service life thereof. On the other hand, as the LED bar 25 directly abuts the first heat dissipation portion 30A and the second heat dissipation portion 30B exposed to the ambient environment, the first heat dissipation portion 30A and the second heat dissipation portion 30B of the device body 21 can be used as a heat dissipation device, thereby resulting in a simplified structure and significantly reducing manufacturing costs.

In order to allow light emitted by the LED bar 25 to be easily guided to a specific spatial area, bumps 31 dedicated to attachment of the LED bar 25 are provided on and protrude from the first heat dissipation portion 30A and the second heat dissipation portion 30B here, and the bumps, together with the first heat dissipation portion 30A and the second heat dissipation portion 30B, enclose and form hollow annular grooves 32 where mounts 26A are placed. The bump 31 is generally cylindrical, and protrudes downward by a certain height, thereby allowing the LED bar 25 that generates heat to be located as far as possible from the electrical drive module 22, and allowing the bump, together with the first heat dissipation portion 30A and the second heat dissipation portion 30B, to enclose and form the sufficiently large hollow annular groove 32. Here, the mounting portion 26A can be fixedly mounted in the hollow annular groove 32 adhesively or in a shape mating manner. Further, a lens 26 directly engages with the mount 26A in a snap-fit manner, and the design facilitates simplification of a mounting process of the explosion-proof lighting device 20.

In FIG. 2, compared with the prior art, as the two LED bars 25 respectively directly attached to the first heat dissipation portion 30A and the second heat dissipation portion 30B are spaced apart farther from each other in the lateral direction, in order to improve a lighting effect, a flat reflective surface 27 is preferably disposed on the entire inner surface of the seal cover 24 here. The reflective surface 27 may be a reflective film or a reflective coating coated or any other appropriate form as long as the arrangement thereof can ensure that emitted light guided by the lens 26 can shine on the flat reflective surface 27 throughout an internal space angle area R defined by the seal cover 24. Correspondingly, a reflective mirror 28 is inserted between the two LED bars 25, that is, below the electrical drive module 22. By means of this design, the reflective mirror 28 can better seal the electrical drive module 22, so as to prevent light and heat in the space angle area R from being undesirably transmitted to the electrical drive module 22, and can also further increase the illumination angle and range of the explosion-proof lighting device 20. That is, in FIG. 2, the flat reflective surface 27 disposed on an inner surface of the seal cover 24 and the reflective mirror 28 disposed between the two LED bars 25 and below the electrical drive module 22 together form a light reflector of the electrical drive module 22.

As shown in FIG. 2, the reflective mirror 28 is design to be generally in the form of a convex lens, and a light reflecting surface that is curved to a certain degree is formed on each of two sides thereof. In this manner, the whole reflecting and projection surface of the light reflector is symmetrically disposed with respect to a central axis of the explosion-proof lighting device 20, such that equal portions of the light reflector are distributed to the LED bars 25 respectively disposed on the two sides of the device body 21. This is advantageous in that the space angle areas R respectively corresponding to the LED bars 25 overlap throughout the illumination area.

The different space angle areas correspondingly overlap, such that light emission is evenly distributed, and a user at a normal distance to an illumination surface substantially cannot see a point light source. Even if the LED bars 25 respectively disposed on the two sides produce different glare, the glare produced by the different LED bars will not appear because light distribution is even, and thus the explosion-proof lighting device can be configured and optimized in a more flexible manner, which is advantageous in cost reduction.

It should be appreciated that although the description is presented according to each embodiment, each embodiment does not necessarily include only one independent technical solution. The presentation manner of the description is merely for clearness, and those skilled in the art should regard the description as a whole, and the technical solutions in the embodiments can also be combined to form other implementations comprehensible by those skilled in the art.

What is described above is merely exemplary specific implementations of the present invention, but is not intended to limit the scope of the present invention. Any equivalent change, modification, or combination made by those skilled in the art without departing from the conception and principle of the present invention shall fall within the protection scope of the present invention.

The invention claimed is:

1. An explosion-proof lighting device comprising:

a device body for accommodating the explosion-proof lighting device, the device body comprising a mounting portion located in the middle portion thereof and a first heat dissipation portion and a second heat dissipation portion that extend from the bottom of the mounting portion to two sides, wherein a hollow cavity is formed inside the mounting portion;

a plurality of light emitting diodes (LEDs) for emitting light to illuminate, the plurality of light emitting diodes being attached to the first heat dissipation portion and the second heat dissipation portion, respectively;

an electrical drive module for powering the light emitting diodes, the electrical drive module being accommodated within the hollow cavity formed inside the mounting portion of the device body so as to be arranged in a laterally offset arrangement with respect to the light emitting diodes attached to the first heat dissipation portion and the second heat dissipation portion;

a seal cover detachably connected to the device body from the bottom thereof, the seal cover being designed to be connected to the device body in an ignition protective manner so as to be resistant to explosion pressure;

wherein the seal cover is designed to have a curved shape that is generally convex downward and has a reflective surface on an inner surface thereof for upwardly reflecting light from the light emitting diodes;

wherein further comprising a reflective mirror provided below the electrical drive module, wherein the reflective mirror is disposed between the first heat dissipation portion and the second heat dissipation portion, and the reflective mirror together with the reflective surface of the seal cover form a light reflector of the explosion-proof lighting device, wherein the reflective mirror is designed to be generally in the form of a convex lens.

2. The explosion-proof lighting device according to claim 1, wherein bumps for the light emitting diodes are provided on the first heat dissipation portion and the second heat dissipation portion respectively and protrude therefrom towards the seal cover, wherein the bumps, together with the first heat dissipation portion and the second heat dissipation portion, enclose and form hollow annular grooves disposed around the bumps.

3. The explosion-proof lighting device according to claim 2, further comprising a mount having a lens, wherein the mount having the lens is attached within the hollow annular groove adhesively or in a shape mating manner.

4. The explosion-proof lighting device according to claim 1, wherein the light reflector is symmetrically disposed with respect to a central axis of the explosion-proof lighting device such that light emitted by the plurality of light emitting diodes overlap throughout an illumination area of the explosion-proof lighting device.

5. The explosion-proof lighting device according to claim 1, wherein the reflective surface is a reflective film or a reflective coating coated on the inner surface of the seal cover.

6. The explosion-proof lighting device according to claim 1, further comprising a gasket disposed along an entire inner circumference of the device body, the seal cover is joined to the device body by means of the gasket in a sealing manner.

7. The explosion-proof lighting device according to claim 1, wherein the electrical drive module is an LED control apparatus comprising a bridge rectifier and an LC series resonator, wherein the light emitting diodes are connected in parallel with a capacitor in the LC series resonator.

8. The explosion-proof lighting device according to claim 1, wherein heights of the first heat dissipation portion and the second heat dissipation portion are designed to be reduced in a direction towards the seal cover.

9. The explosion-proof lighting device according to claim 1, wherein an entirety of each of the first and second heat dissipation portions are laterally spaced from the electrical drive module.

10. The explosion-proof lighting device according to claim 1, wherein the plurality of light emitting diodes are directly attached to the first heat dissipation portion and the second heat dissipation portion on both sides of the electrical drive module.

11. The explosion-proof lighting device according to claim 1, wherein the first and second heat dissipation portions are formed integrally with the device body.

12. An explosion-proof lighting device comprising:

a device body for accommodating the explosion-proof lighting device, the device body comprising a mounting portion located in the middle portion thereof and a first heat dissipation portion and a second heat dissipation portion that extend from the bottom of the mounting portion to two sides, wherein a hollow cavity is formed inside the mounting portion;

a plurality of light emitting diodes (LEDs) for emitting light to illuminate, the plurality of light emitting diodes being attached to the first heat dissipation portion and the second heat dissipation portion, respectively;

an electrical drive module for powering the light emitting diodes, the electrical drive module being accommodated within the hollow cavity formed inside the mounting portion of the device body so as to be arranged in a laterally offset arrangement with respect to the light emitting diodes attached to the first heat dissipation portion and the second heat dissipation portion;

a seal cover detachably connected to the device body from the bottom thereof, the seal cover being designed to be connected to the device body in an ignition protective manner so as to be resistant to explosion pressure;

wherein an entirety of each of the first and second heat dissipation portions are laterally spaced from the electrical drive module, and the plurality of light emitting diodes are directly attached to the first heat dissipation portion and the second heat dissipation portion on both sides of the electrical drive module.

* * * * *